US012044907B2

(12) United States Patent
Salehiomran (10) Patent No.: US 12,044,907 B2
(45) Date of Patent: Jul. 23, 2024

(54) FAST THERMAL TUNING OF A PLANAR LIGHTWAVE CIRCUIT

(71) Applicant: Lumentum Operations LLC, San Jose, CA (US)

(72) Inventor: Ali Salehiomran, Gatineau (CA)

(73) Assignee: Lumentum Operations LLC, San Jose, CA (US)

( * ) Notice: Subject to any disclaimer, the term of this patent is extended or adjusted under 35 U.S.C. 154(b) by 405 days.

(21) Appl. No.: 16/949,929

(22) Filed: Nov. 20, 2020

(65) Prior Publication Data

US 2022/0050313 A1 Feb. 17, 2022

Related U.S. Application Data

(60) Provisional application No. 62/706,402, filed on Aug. 14, 2020.

(51) Int. Cl.
*G02F 1/01* (2006.01)
*G02F 1/035* (2006.01)
*G02F 1/225* (2006.01)

(52) U.S. Cl.
CPC .......... *G02F 1/0147* (2013.01); *G02F 1/0121* (2013.01); *G02F 1/225* (2013.01); *G02F 2203/50* (2013.01)

(58) Field of Classification Search
CPC ...... G02F 1/0147; G02F 1/0121; G02F 1/225; G02F 2203/50; G02F 1/011
USPC ....................................................... 385/1–14
See application file for complete search history.

(56) References Cited

U.S. PATENT DOCUMENTS

| 7,860,408 | B2 * | 12/2010 | Isomura | ................ H04L 27/223 398/214 |
| 2007/0146863 | A1 * | 6/2007 | Suh | .......................... G02F 1/31 359/279 |
| 2009/0097843 | A1 * | 4/2009 | McBrien | .............. H04B 10/505 398/16 |

OTHER PUBLICATIONS

Hiroshi Takahashi, "Planar lightwave circuit devices for optical communication: Present and future", Aug. 2003, 13 pages.
T. Kawai et al., "PLC type compact variable optical attenuator for photonic transport network", Feb. 5, 1998, 2 pages.

* cited by examiner

*Primary Examiner* — Kaveh C Kianni
*Assistant Examiner* — Hung Q Lam
(74) *Attorney, Agent, or Firm* — Harrity & Harrity, LLP (57) ABSTRACT

An optical device may include a planar lightwave circuit (PLC) waveguide to guide an optical signal. The optical device may include a thermo-optic phase shifter to receive a control signal for controlling a temperature of the thermo-optic phase shifter, the temperature of the thermo-optic phase shifter being used to apply a phase shift to the optical signal in the PLC waveguide, and adjust the temperature of the thermo-optic phase shifter based on the control signal. The optical device may include a feedback component to generate feedback associated with applying the phase shift. The optical device may include a controller to adjust the control signal based on the feedback, the control signal being adjusted to reduce a response time of the thermo-optic phase shifter in applying the phase shift.

20 Claims, 7 Drawing Sheets

FAST THERMAL TUNING OF A PLANAR LIGHTWAVE CIRCUIT

CROSS-REFERENCE TO RELATED APPLICATION

This patent application claims priority to U.S. Provisional Patent Application No. 62/706,402, filed on Aug. 14, 2020, and entitled "FAST THERMAL TUNING OF A PLANAR LIGHTWAVE CIRCUIT." The disclosure of the prior application is considered part of and is incorporated by reference into this patent application.

TECHNICAL FIELD

The present disclosure relates generally to a planar lightwave circuit (PLC) and using feedback to improve a response time for thermal tuning of a PLC.

BACKGROUND

A thermo-optic phase-shifter may be used to apply a phase shift to an optical signal by (thermally) changing a refractive index of material in an optical waveguide guiding the optical signal. Thus, a thermo-optic phase shifter can be used to control switching, attenuation, modulation, or the like, of the optical signal. The principle of operation is that by heating the optical waveguide, the lightwave in the optical waveguide can be delayed so as to cause a change from constructive to destructive interference (or vice versa), resulting in switching. A typical thermo-optic phase shifter comprises a resistance heater thermally coupled to a high index core of the optical waveguide. Heat applied by the resistance heater changes the temperature of the core and, as a result, the refractive index of the optical waveguide (since the refractive index of the material is temperature dependent). This changes the integrated product of refractive index and distance (optical pathlength) and, therefore, changes the time required for the passage of the optical signal through the optical waveguide.

SUMMARY

An optical device may include a planar lightwave circuit (PLC) waveguide to guide an optical signal; a thermo-optic phase shifter to receive a control signal for controlling a temperature of the thermo-optic phase shifter, the temperature of the thermo-optic phase shifter being used to apply a phase shift to the optical signal in the PLC waveguide, and adjust the temperature of the thermo-optic phase shifter based on the control signal; a feedback component to generate feedback associated with applying the phase shift; and a controller to adjust the control signal based on the feedback, the control signal being adjusted to reduce a response time of the thermo-optic phase shifter in applying the phase shift.

A method may include receiving, by a thermo-optic phase shifter of an optical device, a control signal associated with controlling a temperature of the thermo-optic phase shifter, the temperature of the thermo-optic phase shifter being used to apply a phase shift to an optical signal, wherein the optical signal is guided by a planar lightwave circuit (PLC) waveguide of the optical device; adjusting, by the thermo-optic phase shifter, the temperature of the thermo-optic phase shifter based on the control signal; generating, by a feedback component of the optical device, feedback associated with applying the phase shift to the optical signal; and adjusting, by a controller of the optical device and based on the feedback, the control signal to reduce a response time of the thermo-optic phase shifter in applying the phase shift.

An optical amplifier may include a thermo-optic phase shifter to receive a control signal for controlling a temperature of the thermo-optic phase shifter, the temperature of the thermo-optic phase shifter being used to apply a phase shift to an optical signal guided in a PLC waveguide, and control a temperature of the thermo-optic phase shifter based on the control signal; a feedback component to provide feedback associated with applying the phase shift to the optical signal; and a controller to selectively modify the control signal based on the feedback in association with reducing a response time of the thermo-optic phase shifter.

DETAILED DESCRIPTION

The following detailed description of example implementations refers to the accompanying drawings. The same reference numbers in different drawings may identify the same or similar elements.

Figure 1A:
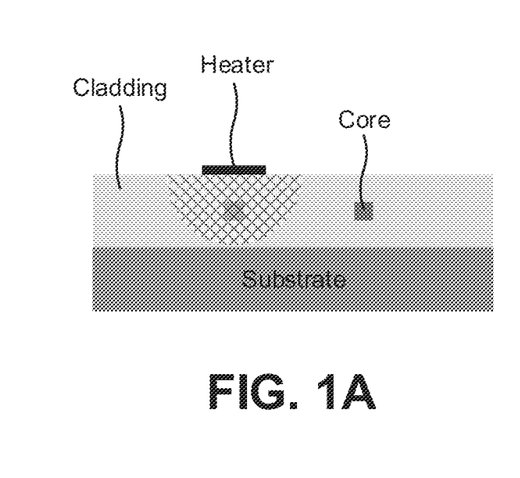
FIGS. 1A and 1B are diagrams illustrating cross-sections of PLC waveguides including thermo-optic phase shifters implemented using heaters
Figure 1B:
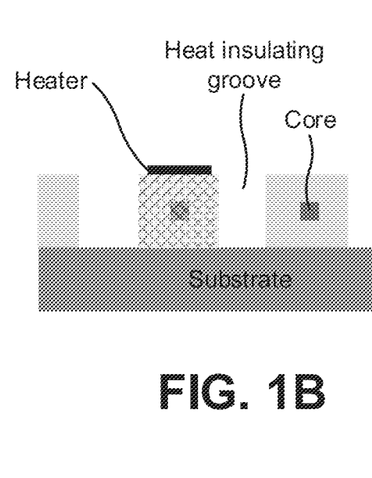

A thermo-optic phase shifter can be implemented in PLC technology. FIGS. 1A and 1B are diagrams illustrating cross-sections of PLC waveguides including thermo-optic phase shifters implemented using heaters (e.g., thin film heaters). FIG. 1A illustrates a typical implementation of a thermo-optic phase shifter with a PLC waveguide, while FIG. 1B illustrates an implementation that uses heat-insulating grooves between cores of the PLC waveguide (e.g., to improve heat insulation between cores of the PLC waveguide). The cross-hatched areas in FIGS. 1A and 1B illustrate areas of the PLC waveguide heated by the heater (e.g., areas of the PLC waveguide in which a refractive index is impacted by the heater). Here, a heat diffusion delay from the heater to the core corresponds to a low pass filter response with a cut-off frequency of approximately 100 hertz (Hz) to approximately 200 Hz.

Conventionally, a thermo-optic phase shifter implemented in PLC is open-loop and has a response time of approximately 2 milliseconds (ms). The response time is an amount of time needed for the core of the PLC waveguide to change temperature (e.g., warm up) in response to a change in heat applied by the heater. Here, since an output optical power is determined by an amount of electrical power applied, there is no ripple in the response of the thermo-optic phase shifter and repeatability of the output optical power is high. However, the response time may be insufficient to be considered for use in some optical devices. For example, a response time between approximately 1 microsecond (µs) and 10 µs may be needed in an optical amplifier (e.g., an erbium-doped fiber amplifier (EDFA)) to be consistent with a transient requirement and, therefore, conventional implementations of a thermo-optic phase shifter implemented in PLC may be impractical. Notably, a response time could be improved to approximately 0.4 ms using a frequency domain pre-emphasis technique (which is still an open-loop approach). However, the response time improvement provided by frequency domain pre-emphasis is still insufficient for some optical devices, such as an EDFA.

In some implementations described herein, an optical device uses a closed-loop feedback technique to improve response time of a thermo-optic phase shifter. In some implementations, the optical device includes a thermo-optic phase shifter to receive a control signal for controlling a temperature of the thermo-optic phase shifter, where the temperature of the thermo-optic phase shifter is used to apply a phase shift to an optical signal in a PLC waveguide. In some implementations, the thermo-optic phase shifter adjusts its temperature based on the control signal. In some implementations, the optical device includes a feedback component to generate feedback associated with applying the phase shift, and a controller to adjust the control signal based on the feedback, where the control signal is adjusted to reduce a response time of the thermo-optic phase shifter in applying the phase shift. Additional details are provided below.

In some implementations, the closed-loop feedback technique described herein can improve the response time of the thermo-optic phase shifter of the optical device to, for example, between approximately 1 μm and approximately 10 μs, while maintaining stability. Thus, the optical device described herein may be suitable in an application that requires a low response time, such as an EDFA. Notably, when combined with high bandwidth driving circuitry, the optical device described herein outperforms an optical device that uses frequency domain pre-emphasis. A further advantage of the closed-loop feedback technique described herein is that there is no need to characterize each heater (e.g., each thermo-optic phase shifter) to determine the frequency pre-emphasis required.

Figure 2A:
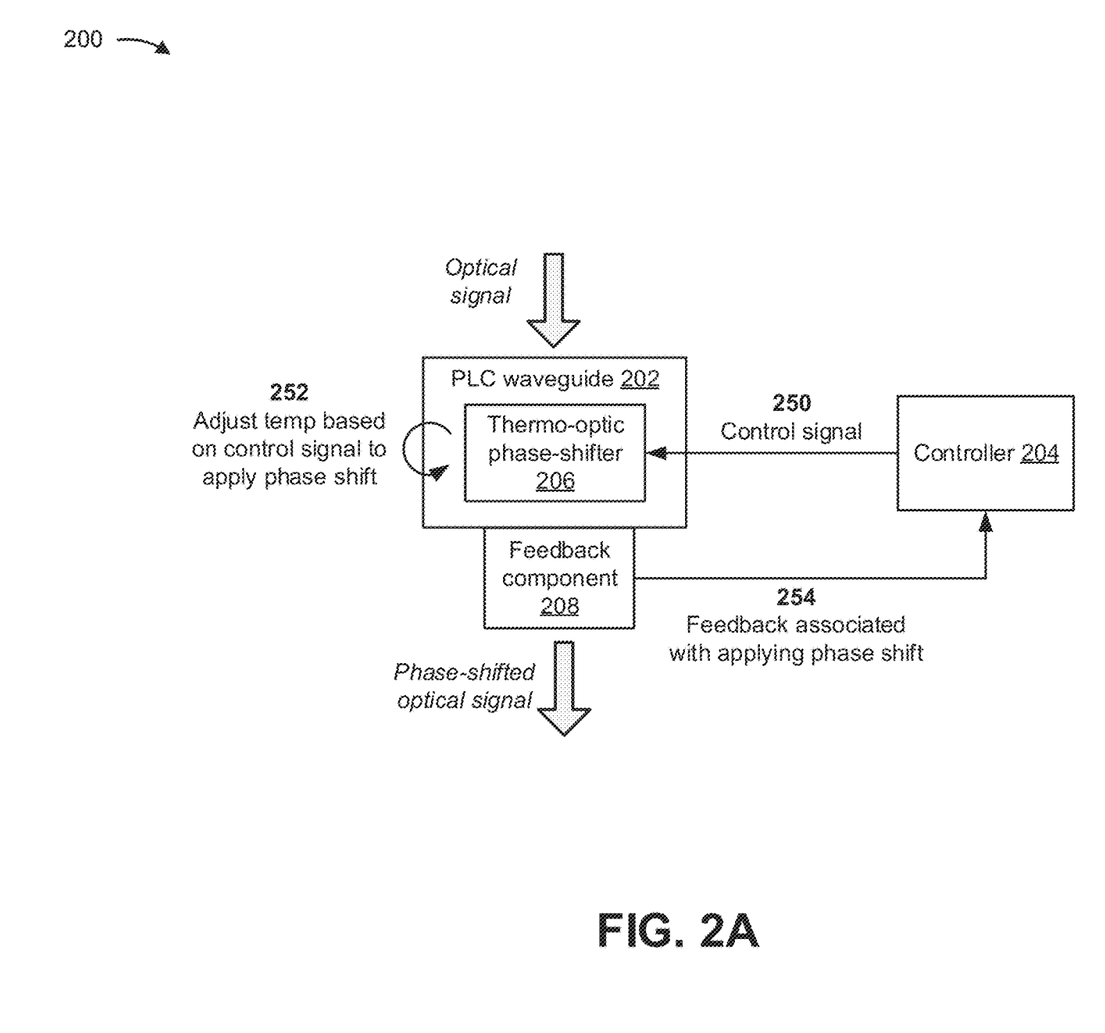
FIGS. 2A and 2B are diagrams associated with an example optical device that provides improved response time using closed-loop feedback, as described herein.
Figure 2B:
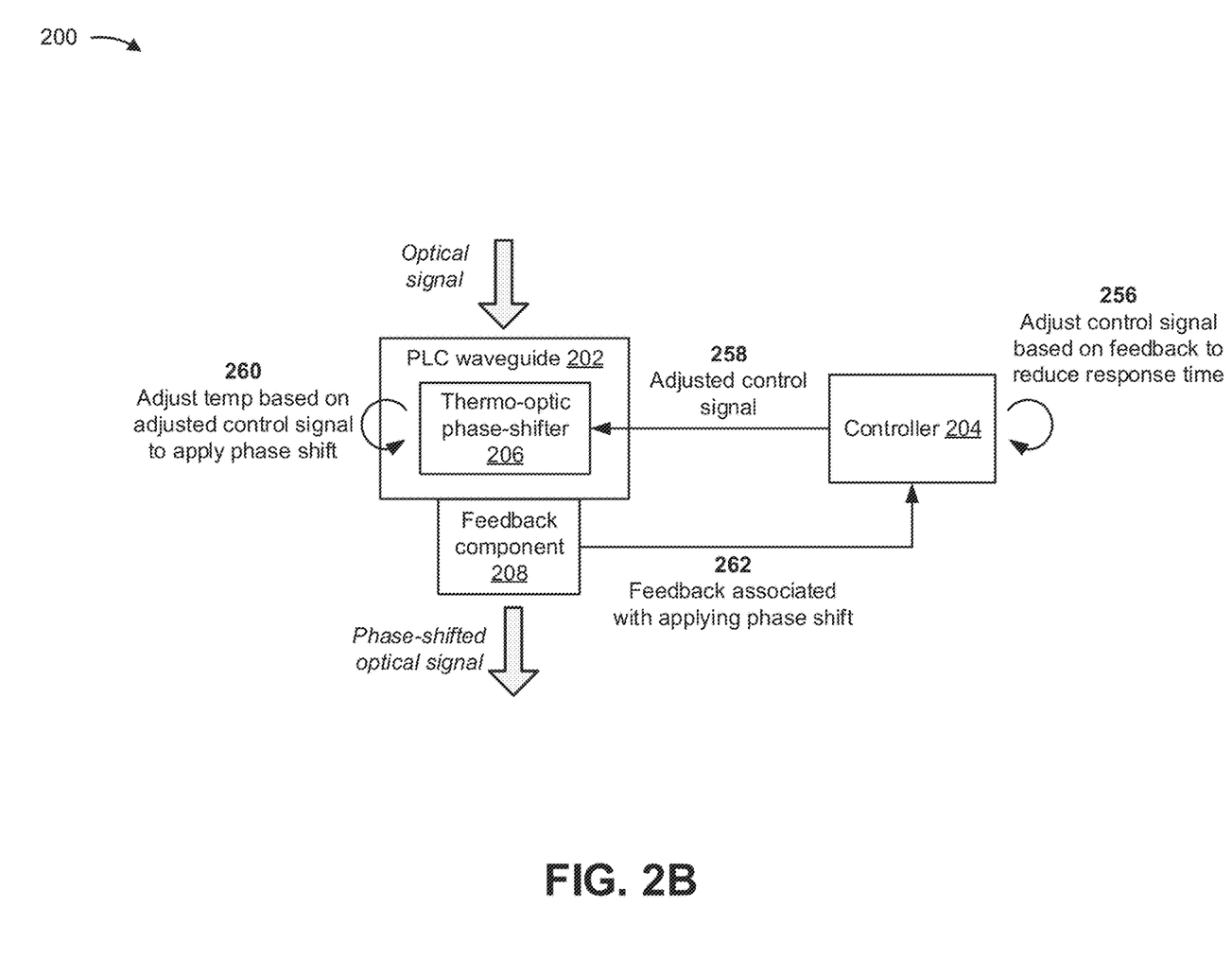

FIGS. 2A and 2B are diagrams associated with an example optical device 200 that provides improved response time using closed-loop feedback. As shown in FIGS. 2A and 2B, optical device 200 includes a PLC waveguide 202, a controller 204, a thermo-optic phase shifter 206, and a feedback component 208. The components of optical device 200 are described below, followed by a description of an example operation of optical device 200. In some implementations, optical device 200 may comprise, for example, an optical amplifier (e.g., an EDFA).

PLC waveguide 202 is a waveguide to guide an optical signal in optical device 200. In some implementations, PLC waveguide 202 may be fabricated with a wafer-scale technology (involving lithography) on a substrate comprising, for example, silicon, silica, a nonlinear crystal material (e.g., lithium niobate (LiNbO3)), or the like. In some implementations, PLC waveguide 202 may include one or more waveguide cores over which one or more thermo-optic phase shifters 206 are arranged in association with applying phase shifts to optical signals guided by the PLC waveguide 202.

Controller 204 is a component to provide a control signal for controlling a temperature of thermo-optic phase shifter 206, where the temperature of thermo-optic phase shifter 206 is used to apply the phase shift to the optical signal in PLC waveguide 202. In some implementations, controller 204 may receive feedback from feedback component 208 and adjust or (selectively) modify the control signal based on the feedback (e.g., to reduce a response time of thermo-optic phase shifter 206 in applying the phase shift), as described below. In some implementations, controller 204 may be, for example, a proportional-integral-derivative (PID) controller that continuously calculates an error value as a difference between a desired setpoint and a measured variable and applies a correction based on proportional, integral, and derivative terms.

Thermo-optic phase shifter 206 is a component to receive the control signal (e.g., from the controller 204) for controlling a temperature of thermo-optic phase shifter 206, where the temperature of thermo-optic phase shifter 206 is used to apply the phase shift to the optical signal in PLC waveguide 202, and adjust or otherwise control the temperature of thermo-optic phase shifter 206 based on the control signal. In some implementations, thermo-optic phase shifter 206 may be, for example, a heater (e.g., a thin film heater) arranged over a core of the PLC waveguide 202, where a temperature of the heater depends on an amount of voltage applied to the heater. Here, a control signal in the form of a voltage signal may be used to control a resistance of thermo-optic phase shifter 206, meaning that a temperature of thermo-optic phase shifter 206 and, therefore, a phase shift applied by thermo-optic phase shifter 206, can be controlled using the control signal.

Feedback component 208 is a component to generate feedback associated with applying the phase shift to the optical signal guided by PLC waveguide 202. In some implementations, feedback component 208 may comprise a tap and a photodiode (PD), further details of which are provided below with regard to FIG. 3. Alternatively, feedback component 208 may comprise a thermistor, further details of which are provided below with regard to FIGS. 4A and 4B.

In operation of optical device 200, starting with reference 250 in FIG. 2A, controller 204 may provide, and thermo-optic phase shifter 206 may receive, a control signal associated with controlling a temperature of thermo-optic phase shifter 206. In some implementations, the control signal is a voltage signal, and level of the voltage signal is used to control the temperature of thermo-optic phase shifter 206 and, therefore, the phase shift applied by thermo-optic phase shifter 206, as described above. Thus, as shown by reference 252, thermo-optic phase shifter 206 may adjust its the temperature based on the control signal.

Next, as shown by reference 254, feedback component 208 may generate, and the controller 204 may receive, feedback associated with applying the phase shift to the optical signal. In some implementations, the feedback indicates a temperature of thermo-optic phase shifter 206. For example, when feedback component 208 comprises a thermistor, the feedback may be an electrical signal the level of which is proportional to a temperature of thermo-optic phase shifter 206. Alternatively, in some implementations, the feedback indicates a result of application of the phase shift to the optical signal. For example, when the feedback component 208 comprises a tap and PD, the feedback may indicate a result of the phase shifting (e.g., amplitude modulation) as measured by the PD.

As shown in FIG. 2B by reference 256, controller 204 may (selectively) adjust or modify the control signal based on the feedback. In some implementations, controller 204 adjusts the control signal to reduce a response time of thermo-optic phase shifter 206 in applying the phase shift. For example, controller 204 may increase a voltage level of the control signal in order to cause a rate of change of the temperature of thermo-optic phase shifter 206 to increase, thereby accelerating the phase shift applied by thermo-optic phase shifter 206. As another example, controller 204 may decrease the voltage level of the control signal in order to cause a rate of change of the temperature of thermo-optic phase shifter 206 to decrease, thereby decelerating the phase shift applied by thermo-optic phase shifter 206. In some implementations, controller 204 may determine that no adjustment is to be made to the control signal and may maintain (i.e., not adjust) the control signal.

Notably, the closed-loop feedback technique described above can be repeated indefinitely (e.g., at a particular time interval). For example, as illustrated by reference 258 in FIG. 2B, controller 204 may provide, and thermo-optic phase shifter 206 may receive, an adjusted control signal after the adjustment by controller 204. As shown by reference 260, thermo-optic phase shifter 206 may readjust the temperature of thermo-optic phase shifter 206 based on the adjusting control signal. As shown by reference 262, feedback component 208 may then generate additional feedback associated with applying the phase shift to the optical signal. Controller 204 may then readjust the control signal to further reduce the response time of thermo-optic phase shifter 206 based on the additional feedback.

As indicated above, FIGS. 2A and 2B are provided as examples. Other examples may differ from what is described with regard to FIGS. 2A and 2B. The number and arrangement of components shown in FIGS. 2A and 2B are provided as an example. In practice, there may be additional components, fewer components, different components, or differently arranged components than those shown in FIGS. 2A and 2B. Furthermore, two or more components shown in FIGS. 2A and 2B may be implemented within a single component, or a single component shown in FIGS. 2A and 2B may be implemented as multiple, distributed components. Additionally, or alternatively, a set of components (e.g., one or more components) shown in FIGS. 2A and 2B may perform one or more functions described as being performed by another set of components shown in FIGS. 2A and 2B.

Figure 3:
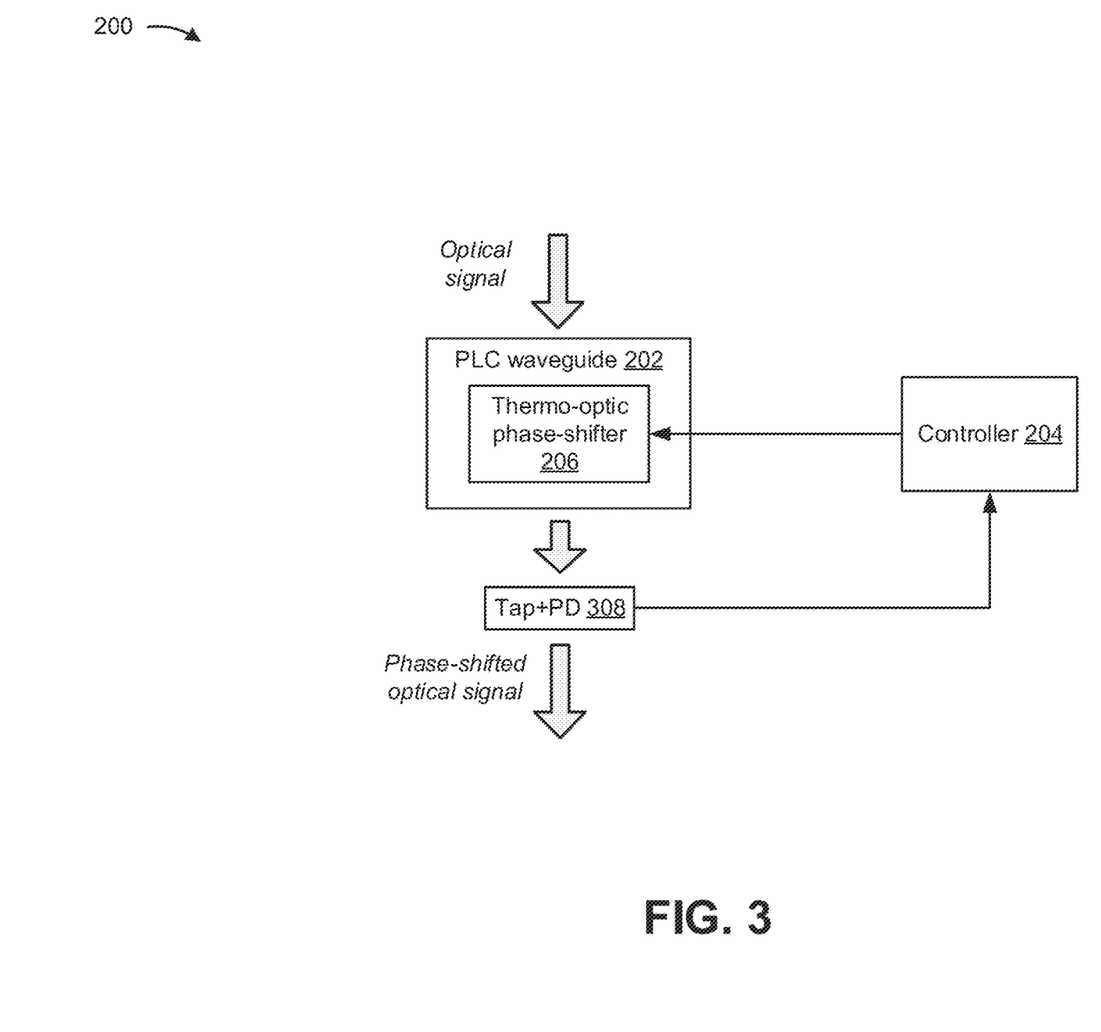
FIG. 3 is a diagram of an example implementation of an optical device with a feedback component comprising a tap and a photodiode.

FIG. 3 is a diagram of an example implementation of optical device 200 with feedback component 208 comprising a tap and PD 308. In such an implementation, the tap may direct a portion of a phase-shifted optical signal (e.g., after the phase shift is applied to the optical signal) to the PD. The PD may then measure a result of the phase shifting (e.g., amplitude modulation), and may provide feedback indicating the result of the phase shifting.

In some implementations, thermo-optic phase shifter 206 may be one of N(N≥1) thermo-optic phase shifters 206 of optical device 200 and the PD may be one of M (N≥M) photodiodes of optical device 200, where the N thermo-optic phase shifters 206 are controlled using the M photodiodes.

As indicated above, FIG. 3 is provided as an example. Other examples may differ from what is described with regard to FIG. 3. The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

Figure 4A:
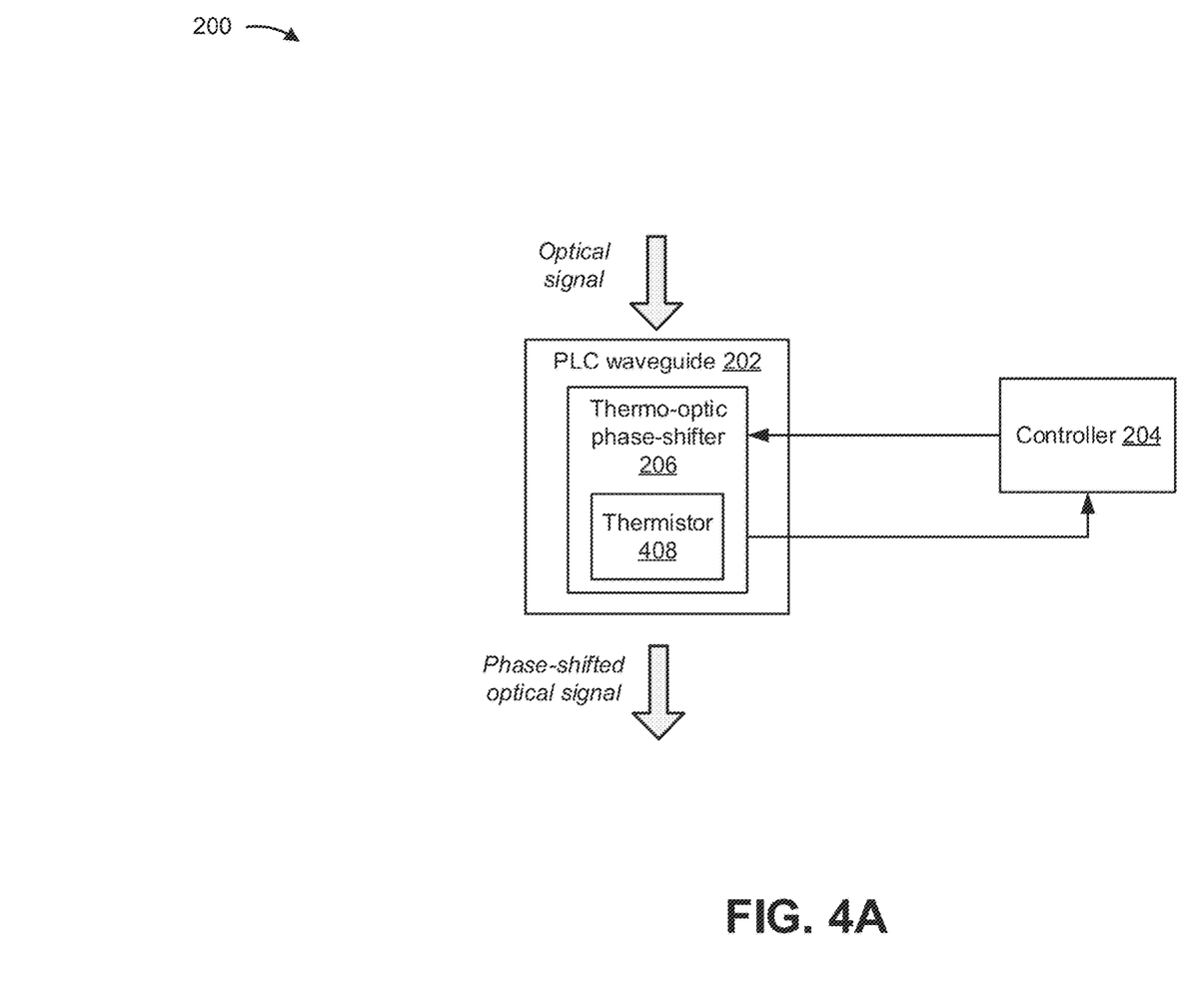
FIGS. 4A and 4B are diagrams of an example implementation of an optical device with a feedback component comprising a thermistor.
Figure 4B:
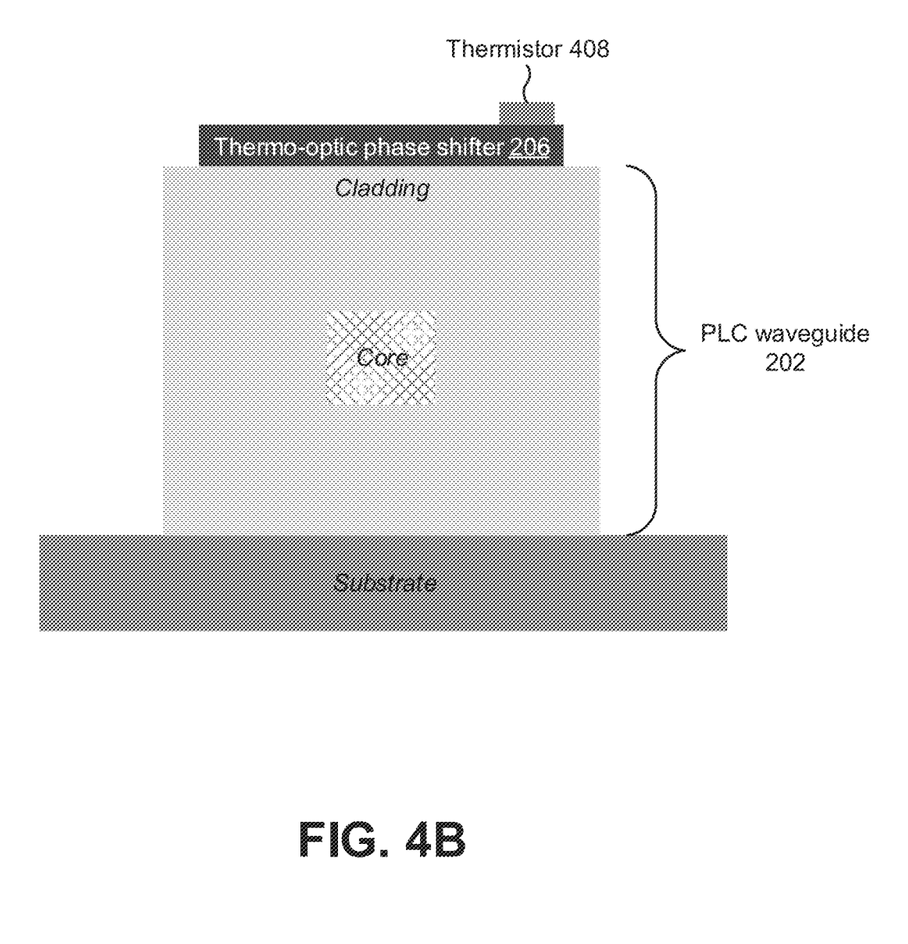

FIGS. 4A and 4B are diagrams of an example implementation of optical device 200 with feedback component 208 comprising a thermistor 408. In such an implementation, the thermistor 408 is arranged such that a resistance of thermistor 408 depends on the temperature of thermo-optic phase shifter 206. Thus, the feedback provided by the thermistor 408 may indicate a temperature of thermo-optic phase shifter 206. For example, the feedback may be an electrical signal the level of which is proportional to a temperature of thermo-optic phase shifter 206. As shown in FIGS. 4A and 4B, in such an implementation, the thermistor 408 may be arranged on or over thermo-optic phase shifter 206.

In some implementations, thermo-optic phase shifter 206 may be one of N(N≥1) thermo-optic phase shifters 206 of optical device 200 and thermistor 408 may be one of N thermistors 408 of optical device 200 (e.g., such that each thermo-optic phase shifter 206 can be controlled using a dedicated thermistor 408).

As indicated above, FIGS. 4A and 4B are provided as examples. Other examples may differ from what is described with regard to FIGS. 4A and 4B. The number and arrangement of components shown in FIGS. 4A and 4B are provided as an example. In practice, there may be additional components, fewer components, different components, or differently arranged components than those shown in FIGS. 4A and 4B. Furthermore, two or more components shown in FIGS. 4A and 4B may be implemented within a single component, or a single component shown in FIGS. 4A and 4B may be implemented as multiple, distributed components. Additionally, or alternatively, a set of components (e.g., one or more components) shown in FIGS. 4A and 4B may perform one or more functions described as being performed by another set of components shown in FIGS. 4A and 4B.

Figure 5:
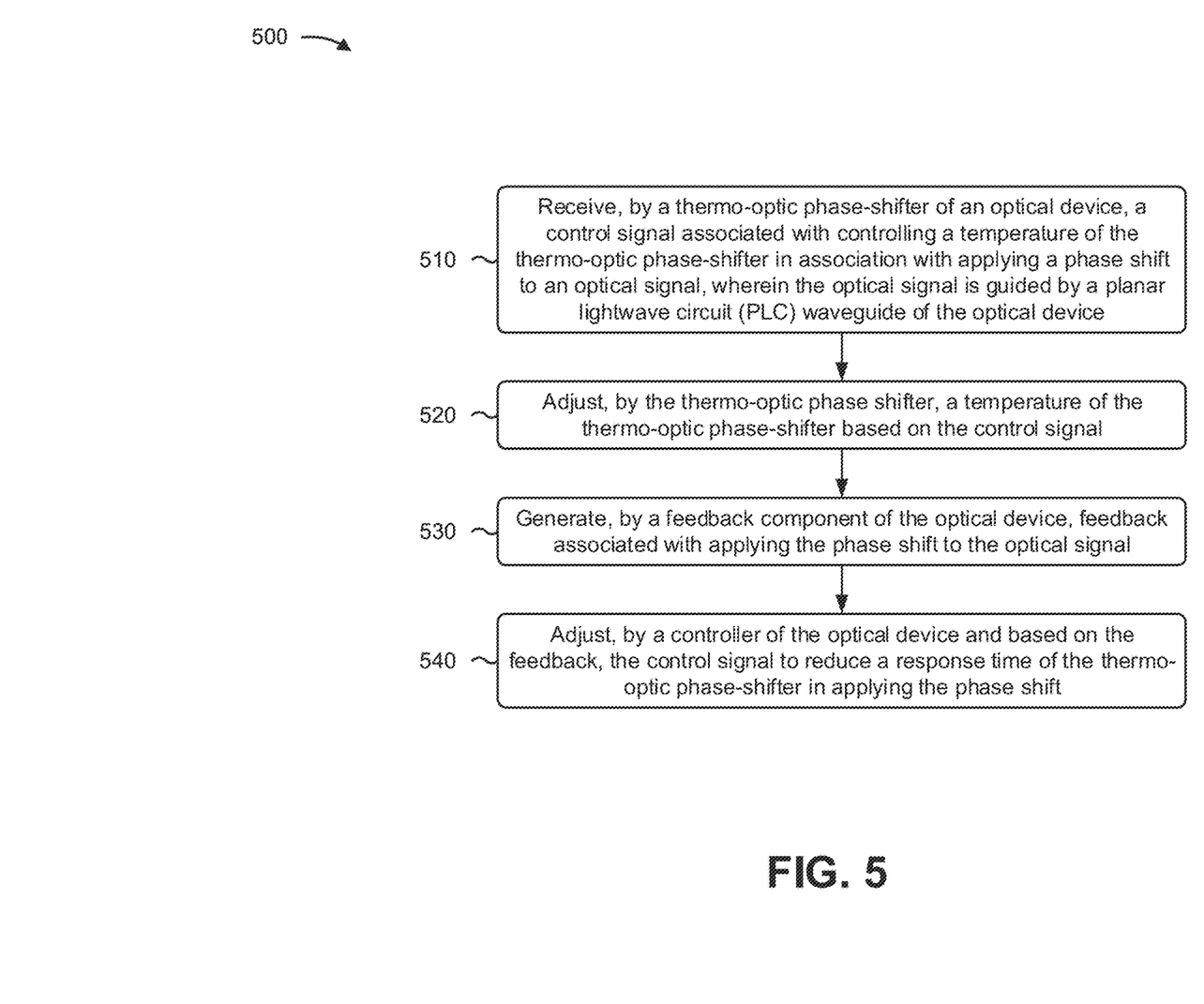
FIG. 5 is a flowchart of an example processes relating to fast thermal tuning of a PLC waveguide.

FIG. 5 is a flowchart of an example process 500 relating to fast thermal tuning of a PLC waveguide. In some implementations, one or more process blocks of FIG. 5 may be performed by a component of optical device 200 (e.g., controller 204, thermo-optic phase shifter 206, feedback component 208, or the like).

As shown in FIG. 5, process 500 may include receiving a control signal associated with controlling a temperature of a thermo-optic phase shifter, the temperature of the thermo-optic phase shifter being used to apply a phase shift to an optical signal, wherein the optical signal is guided by a PLC waveguide of the optical device (block 510). For example, thermo-optic phase shifter 206 may receive a control signal associated with controlling a temperature of thermo-optic phase shifter 206, the temperature of thermo-optic phase shifter 206 being used to apply a phase shift to an optical signal, as described above. In some implementations, the optical signal is guided by PLC waveguide 202 of optical device 200.

As further shown in FIG. 5, process 500 may include adjusting the temperature of the thermo-optic phase shifter based on the control signal (block 520). For example, thermo-optic phase shifter 206 may adjust the temperature of thermo-optic phase shifter 206 based on the control signal, as described above.

As further shown in FIG. 5, process 500 may include generating feedback associated with applying the phase shift to the optical signal (block 530). For example, feedback component 208 may generate feedback associated with applying the phase shift to the optical signal, as described above.

As further shown in FIG. 5, process 500 may include adjusting, based on the feedback, the control signal to reduce a response time of the thermo-optic phase shifter in applying the phase shift (block 540). For example, controller 204 may adjust, based on the feedback, the control signal to reduce a response time of thermo-optic phase shifter 206 in applying the phase shift, as described above.

Process 500 may include additional implementations, such as any single implementation or any combination of implementations described below and/or in connection with one or more other processes described elsewhere herein.

In a first implementation, feedback component 208 comprises a thermistor.

In a second implementation, alone or in combination with the first implementation, the feedback indicates a temperature of thermo-optic phase shifter 206 and is an electrical signal that is proportional to a temperature of thermo-optic phase shifter 206.

In a third implementation, alone or in combination with one or more of the first and second implementations, feedback component 208 comprises a tap and a photodiode.

In a fourth implementation, alone or in combination with one or more of the first through third implementations, the feedback indicates a result of applying the phase shift to the optical signal.

In a fifth implementation, alone or in combination with one or more of the first through fourth implementations, thermo-optic phase shifter 206 is one of N(N≥1) thermo-optic phase shifters 206 of the optical device 200 and the photodiode is one of M (N≥M) photodiodes of the optical device 200, N thermo-optic phase shifters 206 being controlled using the M photodiodes.

In a sixth implementation, alone or in combination with one or more of the first through fifth implementations, process 500 includes receiving, by thermo-optic phase shifter 206 and after the adjustment of the control signal, an adjusted control signal; readjusting, by thermo-optic phase shifter 206, the temperature of thermo-optic phase shifter 206 based on the adjusting control signal; generating, by feedback component 208, additional feedback associated with applying the phase shift to the optical signal; and readjusting, by controller 204 and based on the additional feedback, the control signal to further reduce a response time of the thermo-optic phase shifter 206 in applying the phase shift.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical device, comprising:
a planar lightwave circuit (PLC) waveguide to guide an optical signal;
a thermo-optic phase shifter to:
receive a control signal for controlling a temperature of the thermo-optic phase shifter, the temperature of the thermo-optic phase shifter being used to apply a phase shift to the optical signal in the PLC waveguide, and
adjust the temperature of the thermo-optic phase shifter based on the control signal;
a feedback component to generate feedback associated with applying the phase shift,
wherein the feedback component comprises a thermistor arranged on the thermo-optic phase shifter; and
a controller to adjust the control signal based on the feedback, the control signal being adjusted to reduce a response time of the thermo-optic phase shifter in applying the phase shift.

2. The optical device of claim 1, wherein the feedback comprises a temperature of the thermo-optic phase shifter.

3. The optical device of claim 1, wherein the feedback is an electrical signal that is proportional to a temperature of the thermo-optic phase shifter.

4. The optical device of claim 1, wherein the feedback component is to generate additional feedback after the control signal is adjusted, and the controller is to readjust the control signal based on the additional feedback.

5. The optical device of claim 1, wherein the optical device is an optical amplifier.

6. A method, comprising:
receiving, by a thermo-optic phase shifter of an optical device, a control signal associated with controlling a temperature of the thermo-optic phase shifter, the temperature of the thermo-optic phase shifter being used to apply a phase shift to an optical signal,
wherein the optical signal is guided by a planar lightwave circuit (PLC) waveguide of the optical device,
adjusting, by the thermo-optic phase shifter, the temperature of the thermo-optic phase shifter based on the control signal;
generating, by a feedback component of the optical device, feedback associated with applying the phase shift to the optical signal,
wherein the feedback component comprises
a thermistor arranged on the thermo-optic phase shifter; and
adjusting, by a controller of the optical device and based on the feedback, the control signal to reduce a response time of the thermo-optic phase shifter in applying the phase shift.

7. The method of claim 6, wherein the feedback comprises a temperature of the thermo-optic phase shifter and is an electrical signal that is proportional to a temperature of the thermo-optic phase shifter.

8. The method of claim 6, wherein the feedback component further comprises a tap and a photodiode.

9. The method of claim 8, wherein the feedback indicates a result of applying the phase shift to the optical signal.

10. The method of claim 8, wherein the thermo-optic phase shifter is one of N (N≥1) thermo-optic phase shifters of the optical device and the photodiode is one of M (N≥M) photodiodes of the optical device, the N thermo-optic phase shifters being controlled using the M photodiodes.

11. The method of claim 6, further comprising:
receiving, by the thermo-optic phase shifter and after the adjustment of the control signal, an adjusted control signal;
readjusting, by the thermo-optic phase shifter, the temperature of the thermo-optic phase shifter based on the adjusting control signal;
generating, by the feedback component, additional feedback associated with applying the phase shift to the optical signal; and
readjusting, by the controller and based on the additional feedback, the control signal to further reduce a response time of the thermo-optic phase shifter in applying the phase shift.

12. An optical amplifier, comprising:
a thermo-optic phase shifter to:
receive a control signal for controlling a temperature of the thermo-optic phase shifter, the temperature of the thermo-optic phase shifter being used to apply a phase shift to an optical signal guided in a planar lightwave circuit (PLC) waveguide, and
control a temperature of the thermo-optic phase shifter based on the control signal;
a feedback component to provide feedback associated with applying the phase shift to the optical signal,
wherein the feedback component comprises a thermistor arranged on the thermo-optic phase shifter; and
a controller to selectively modify the control signal based on the feedback in association with reducing a response time of the thermo-optic phase shifter.

13. The optical amplifier of claim 12, wherein the optical amplifier is an erbium-doped fiber amplifier.

14. The optical amplifier of claim 12, wherein the feedback indicates a result of application of the phase shift to the optical signal.

15. The optical amplifier of claim 12, wherein the feedback component further comprises a tap and photodiode arranged to direct a portion of the optical signal to the photodiode after application of the phase shift, and
wherein the thermo-optic phase shifter is one of N(N≥1) thermo-optic phase shifters of the optical amplifier and the photodiode is one of M (N≥M) photodiodes of the optical amplifier, the N thermo-optic phase shifters being controlled using the M photodiodes.

16. The optical amplifier of claim 12, wherein the feedback component generates additional feedback after the control signal is adjusted, and the controller readjusts the control signal based on the additional feedback.

17. The optical device of claim 1, wherein the thermo-optic phase shifter is arranged on a cladding portion of the PLC waveguide.

18. The method of claim 6, wherein the optical device is an erbium-doped fiber amplifier.

19. The optical amplifier of claim 12, wherein the thermo-optic phase shifter is further arranged on a cladding portion of the PLC waveguide and over a core of the PLC waveguide, and wherein the PLC waveguide is arranged on a substrate.

20. The method of claim 6, wherein the thermo-optic phase shifter is arranged on a cladding portion of the PLC waveguide.

* * * * *